H. FISCHER.
FEEDING MECHANISM FOR SLICING MACHINES.
APPLICATION FILED DEC. 12, 1914.
1,157,520.
Patented Oct. 19, 1915.
2 SHEETS—SHEET 1.
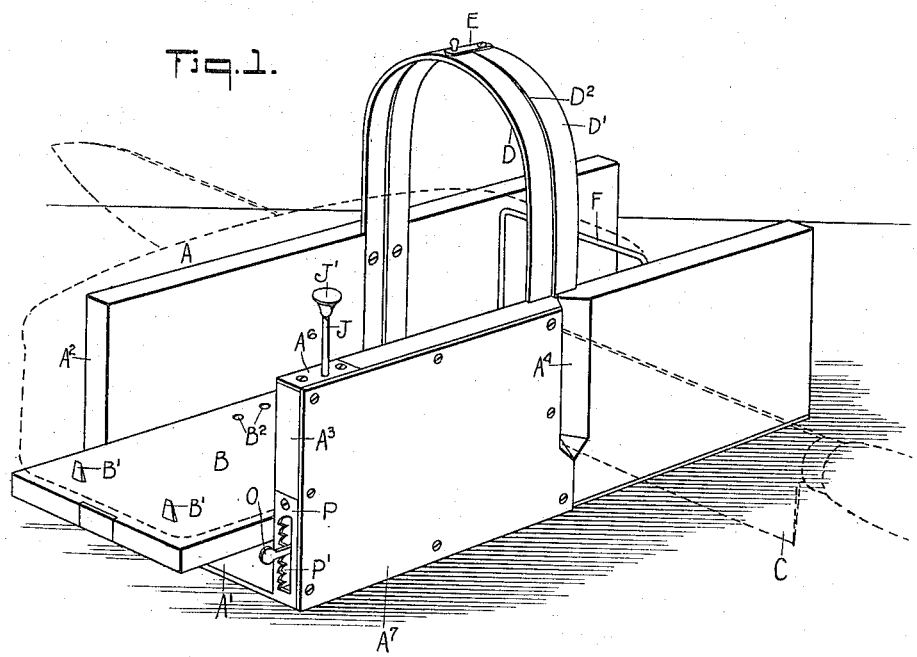
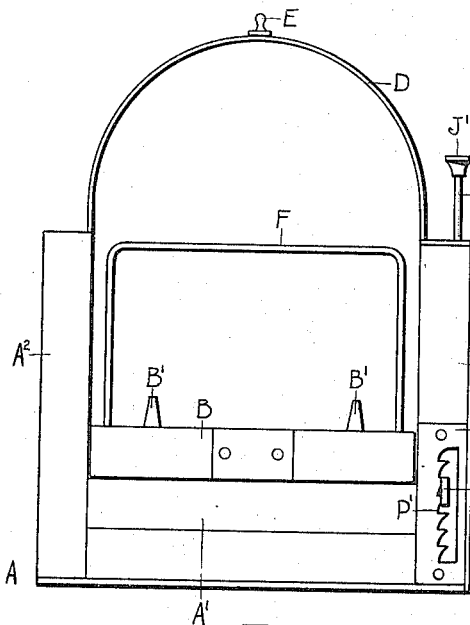
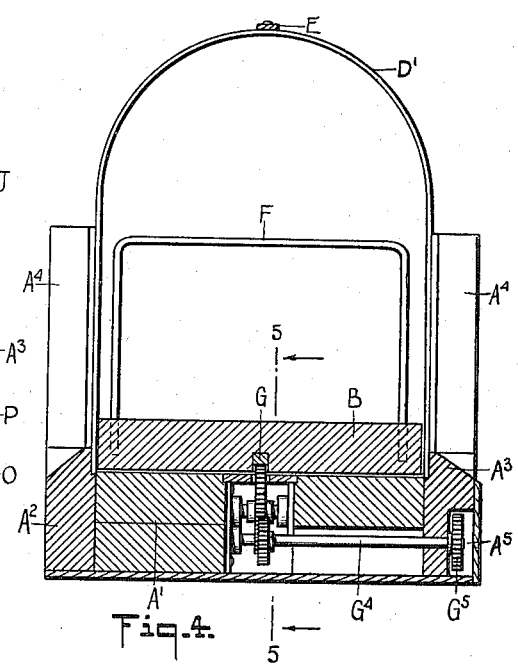
WITNESSES
INVENTOR
Hermann Fischer
BY
ATTORNEYS

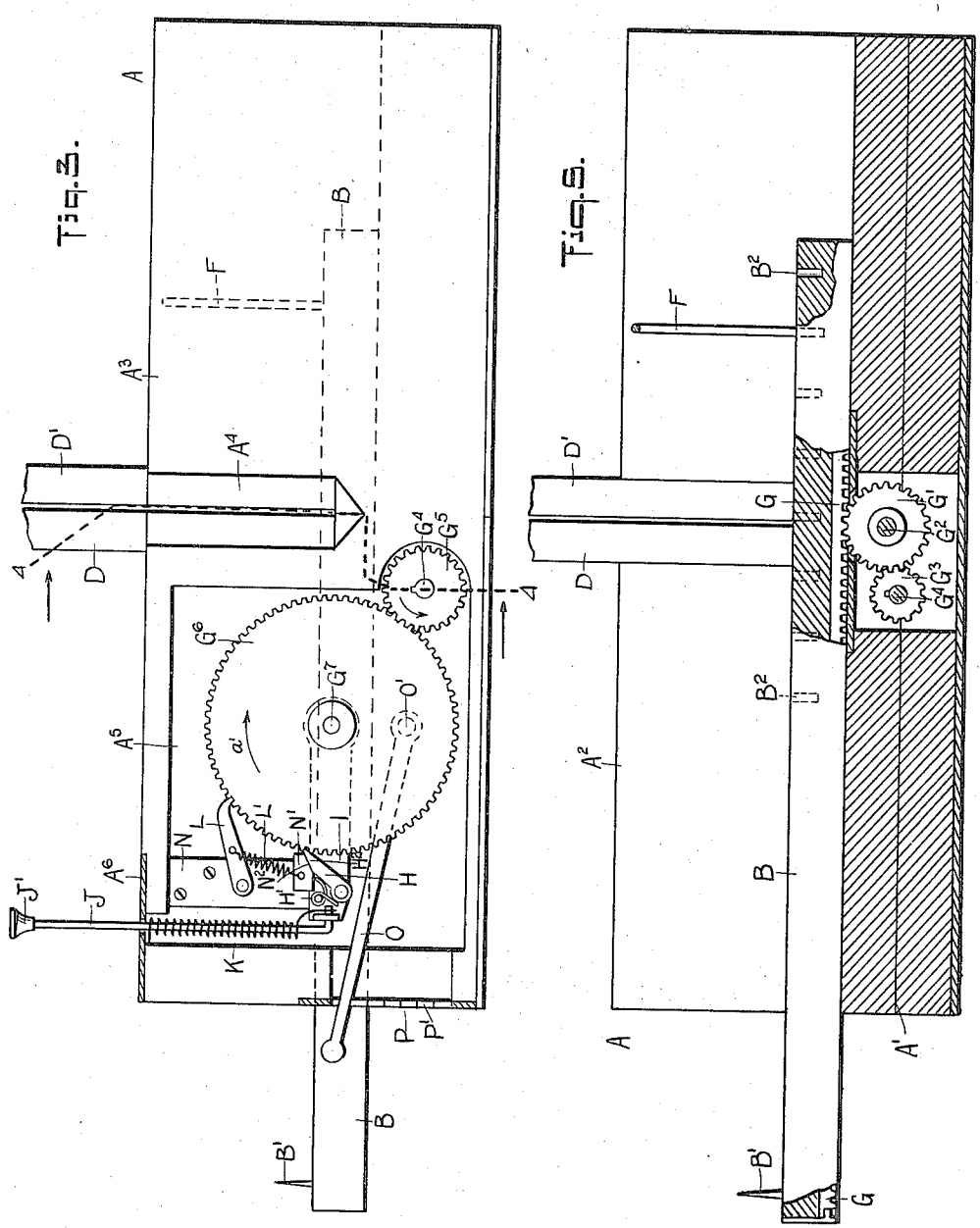

UNITED STATES PATENT OFFICE.

HERMANN FISCHER, OF NEW YORK, N. Y.

FEEDING MECHANISM FOR SLICING-MACHINES.

1,157,520.　　　　　Specification of Letters Patent.　　Patented Oct. 19, 1915.

Application filed December 12, 1914.　Serial No. 876,849.

*To all whom it may concern:*

Be it known that I, HERMANN FISCHER, a subject of the German Emperor, and a resident of the city of New York, borough of Manhattan, in the county and State of New York, have invented a new and Improved Feeding Mechanism for Slicing-Machines, of which the following is a full, clear, and exact description.

The object of the invention is to provide a new and improved feeding mechanism for slicing machines more especially designed for slicing loaves of bread or other foodstuffs by the use of an ordinary knife wielded by the operator, the machine being arranged to provide a guide for the knife, a plate for supporting the bread, and manually controlled means for imparting a step by step movement to the bread plate, the throw being variable according to the desired thickness of the slices.

In order to accomplish the desired result, use is made of a frame provided intermediate its ends with a transversely extending guide for the knife, a supporting plate slidable lengthwise on the said frame for carrying the bread or other article to be sliced past the said knife guide, a manually controlled means for imparting a step by step movement to the said supporting plate, and adjusting means to allow of giving a shorter or a longer step by step movement to the said supporting plate.

A practical embodiment of the invention is represented in the accompanying drawings forming a part of this specification, in which similar characters of reference indicate corresponding parts in all the views.

Figure 1 is a perspective view of a slicing machine embodying my invention; Fig. 2 is a rear end view of the same; Fig. 3 is a side elevation of the same with the covering plate for the actuating mechanism removed; Fig. 4 is a cross section of the slicing machine on the line 4—4 of Fig. 3; and Fig. 5 is a sectional side elevation of the same on the line 5—5 of Fig. 4, with parts in elevation.

The frame A of the slicing machine is made U shape in cross section, that is, is provided with a bottom A' and two sides A², A³ between which extends a supporting plate B slidable lengthwise on the bottom A' of the frame A. The supporting plate B is provided near its rear end with upwardly projecting points B' into which the bottom of the loaf of bread or other article is pressed to hold the said loaf in position on the top of the supporting plate B during the slicing operation, which latter is accomplished by an ordinary bread knife C, indicated in dotted lines in Fig. 1. The knife C is guided in its transverse cutting movement by the use of a guide formed of two arch-shaped bands D and D' secured to the inner faces of the sides A², A³ and spaced apart to form a distance corresponding to the thickness of the blade of the knife C. A slot D² formed between the guide bands D and D' registers with slots A⁴ formed in the sides A², A³ of the main frame A, and the side walls of the slots A⁴ are beveled in an outward direction, as plainly indicated in Fig. 1, to prevent the blade of the knife C from binding. On the top of one of the guide bands D' is pivoted a closing catch E adapted to extend across the slot D² to prevent the knife from being accidentally disengaged from the knife guide when returning the knife to the top of the loaf of bread for cutting a new slice, as hereinafter more fully explained.

In order to prevent the slices cut off the loaf of bread from falling over on the supporting plate B, use is made of a holder F, preferably in the form of an inverted U-shaped wall extending crosswise between the sides A², A³ of the frame A. The lower ends of the holder F are removably inserted in rows of recesses B² formed in the top of the supporting plate B near the side edges thereof. When the loaf of bread has been placed in position on the supporting plate B and the rear end of the said loaf of bread has been engaged with the points B' then the operator places the holder F in position on the supporting plate B at the front end of the loaf so that when the latter is sliced the slices are held in upright position by the holder F.

In order to impart a step by step movement to the supporting plate B, the following arrangement is made: In a longitudinal groove in the under side of the supporting plate B is secured a rack G (see Figs. 4 and 5) in mesh with a gear wheel G' having a shaft G² journaled in suitable bearings arranged on the bottom A' of the main frame A. The gear wheel G' meshes with a pinion G³ secured on a transverse shaft G⁴ journaled in suitable bearings on the bottom A' and extending into a recess A⁵ formed in the outer face of the side A³. On the outer end of the shaft G⁴ is secured a gear wheel G⁵ in mesh with a gear wheel G⁶ mounted to turn on a stud G⁷ held on the side A³ of the main frame A, as plainly shown in Fig. 3. The gear wheel G⁶ is engaged by a pawl H pressed on by a spring H' and pivoted on a lever I fulcrumed loosely on the stud G⁷ to swing up and down in the recess A⁵. The free end of the lever I is pivotally connected with the lower end of a rod J extending upwardly through the recess A⁵ and through a guide plate A⁶ formed on the top of the side A³ of the main frame A.

The upper outer end of the rod J is provided with a knob or a handle J' to permit of conveniently pressing the rod J downward with a view to impart a downward swinging movement to the lever I to cause the pawl H to glide over the teeth of the gear wheel G⁶. A return movement is given to the rod J and the lever I by a spring K which is preferably coiled on the lower portion of the rod J and is attached at its lower end to the rod J and at its upper end to the side A³ adjacent the guide plate A⁶. When the operator releases the knob J' the rod J is returned by the action of the spring K so that a return swinging movement is given to the lever I to cause the pawl H to rotate the gear wheel G⁶ in the direction of the arrow a'. The rotary motion of the gear wheel G⁶ is transmitted by the train of gear wheels G⁵, G³ and G' to the rack G to cause the latter and consequently the platform B to travel intermittently forward to present a new portion of the loaf of bread to the knife C held in the slot D² of the guide. The return movement of the gear wheel G⁶ is prevented by a dog L fulcrumed on a bracket N attached to the side A³ at the recess A⁵ and the said dog L is pressed on by a spring L' to hold the dog in engagement with the gear wheel G⁶. Return movement of the lever I is limited by the pawl H abutting against a lug N' formed on the bracket N, the said pawl having a beveled portion H² engaging a corresponding bevel N² on the lug N', thus holding the pawl H in locked engagement with the gear wheel G⁶ to prevent accidental returning movement of the gear wheel G⁶ in either direction at the same time limiting the upward movement of the lever I.

In order to increase or decrease the movement given at the time to the supporting plate B, the downward swinging movement of the lever I is limited by a stop arm O fulcrumed at O' on the side A³ and extending rearwardly beyond the rear end of the side A³. The outer end of the stop arm O is adapted to engage one of a series of notches P' in a plate P attached to the rear end of the side A³. By swinging the arm O up or down it is moved nearer to or farther from the lower end of the lever I thus limiting the downward swinging movement of the lever I, the upward swinging movement of which is limited by the pawl H engaging the lug N' as before explained. By engaging the arm O with the top notch P' the downward swinging given to the lever I on pressing the knob J' is very little and consequently the supporting plate B is moved forward but a short distance to permit of cutting exceedingly thin slices from the loaf of bread or other article held on the supporting plate B at the time. On engaging arm O with one of the notches P' farther down the supporting plate B is moved forward a correspondingly longer distance to permit of cutting slices of bread of correspondingly increased thickness. The recess A⁵ is covered by a covering plate A⁷ so that the actuating mechanism for imparting a step by step movement to the supporting plate B is not visible excepting the upper end of the rod J and the outer end of the arm O and plate P.

The slicing machine shown and described is very simple and durable in construction and is especially designed for family use.

Having thus described my invention, I claim as new and desire to secure by Letters Patent:

1. A feeding mechanism, comprising a frame, a member mounted to slide lengthwise on the said frame, a lever, means controlled by the movement of the lever for imparting a step by step movement to the said member, a manually controlled actuating rod connected at one end with the lever for actuating the same in one direction, means for imparting a return movement to the rod and lever, a pivoted stop arm arranged in the path of the lever and extending at its outer end beyond the end of the frame, the said arm being adjustable toward and from the lever for limiting the throw of the lever to allow of giving a longer or shorter step by step movement to the said member, and means at the end of the frame for engagement by the stop arm to hold the latter in adjusted position.

2. A feeding mechanism, comprising a frame, a supporting member mounted to slide lengthwise on the said frame, a lever mounted to swing up and down, means controlled by the movement of the lever for imparting a step by step movement to the said supporting member, a manually controlled rod connected at one end with the lever for actuating the same, a spring for returning the rod and lever to normal position, a pivoted stop arm adjustable toward and from the lever for adjusting the throw of the lever to allow of giving a longer or shorter step by step movement to the said supporting member, and means for holding the stop arm in adjusted position.

3. A feeding mechanism, comprising a frame, a supporting plate mounted to slide on the said frame, a rack extending lengthwise on the said supporting plate, a train of gear wheels mounted on the said frame and of which the gear wheel at one end of the train of gear wheels is in mesh with the said rack, a pawl engaging the gear wheel on the other end of the train of gear wheels, a lever carrying the said pawl, manually controlled means engaging the said lever for imparting a swinging motion to the lever to cause the pawl to turn the train of gear wheels and thereby impart a step by step motion to the said supporting plate, a stop arm fulcrumed at its inner end on the said frame and extending into the path of the said lever to limit the swinging motion thereof, the said arm projecting at its outer end beyond the frame, and a notched plate on the end of the frame adapted to be engaged by the said stop arm to hold the latter in an adjusted position.

4. In a feeding mechanism, a movable member provided with a rack, a train of gear wheels one of which is in mesh with the said rack, a pawl engaging one of said gear wheels, a lever carrying the said pawl and mounted to swing up and down, means for imparting a downward swinging motion to the lever to cause the pawl to glide over the teeth of its gear wheel, adjustable means for limiting the downward swinging movement of the lever, means for imparting a return movement to the lever to cause the pawl to turn the train of gear wheels and impart a step by step movement to the said movable member, means for preventing the return movement of the gear wheels, and a fixed stop engaged by the said pawl on the return movement of the lever, the said stop having a beveled portion engaging a corresponding bevel on the pawl to hold the pawl in locked engagement with its gear wheel and also serving to limit the return movement of the lever.

5. In a feeding mechanism for slicing machines, a frame, a supporting plate mounted to slide lengthwise on said frame and adapted to support an article to be sliced, a lever mounted to swing up and down in said frame, means controlled by the movement of the lever for imparting a step by step movement to said supporting plate, an actuating rod connected with the lever for imparting a downward swinging motion to the same, a spring for imparting a return movement to the rod and lever, an adjustable stop arm for limiting the downward swinging movement of the lever, the said stop arm extending in the frame below the lever and fulcrumed at its inner end, the said arm projecting at its outer end beyond the frame, means on the frame for engagement by the said stop arm to hold the latter in adjusted position, and means for limiting the return movement of the lever.

6. In a feeding mechanism, a frame having bottom and side members, one of said side members having a recess in its outer face, a supporting plate mounted to slide lengthwise on the bottom of said frame, a lever mounted to swing up and down in the said recess in the side member, means controlled by the movement of the lever for imparting a step by step movement to said supporting plate, an actuating rod extending through the top of said recessed side member into the recess and connected at its lower end with the said lever, and means for limiting the throw of said lever.

7. In a feeding mechanism, a frame having a bottom and side members, a supporting plate mounted to slide lengthwise on the bottom between the side members, one of said side members having a recess formed therein, a lever mounted to swing up and down in said recess, means controlled by the movement of the lever for imparting a step by step movement to said supporting plate, means connected with the lever for actuating the same, an adjustable stop arm for limiting the throw of the lever, the said stop arm extending into said recess below the lever and fulcrumed to said side member, and a plate secured to the end of said side member and through which the outer end of said stop arm extends, the said plate being provided with notches for engagement by the said stop arm.

8. A feeding mechanism for slicing machines, comprising a frame, a supporting plate for the article to be sliced, the said supporting plate being mounted to slide lengthwise on the said frame and having a longitudinal groove in its under face, a rack secured in the said groove, a train of gear wheels mounted on the frame, the gear wheel at one end of the train being in mesh with said rack, the frame having a recess at one side thereof in which the gear wheel at the other end of said train is arranged, a pawl engaging the last mentioned gear wheel, a lever carrying the said pawl and fulcrumed loosely on the axis of said gear wheel to swing up and down in the said recess, an actuating member pivotally connected at its lower end with the free end of said lever, and extending upwardly through the top of the recessed side of the frame, and a stop arm mounted to swing up and down in the recessed side of the frame below the said lever, the said arm extending rearwardly beyond the end of said side, and a notched plate on the rear end of the recessed side of the frame and adapted to be engaged by the said stop arm.

9. A feeding mechanism for slicing machines, comprising a frame having bottom and side members, one of said side members having a recess formed in the outer face thereof, a supporting plate for the article to be sliced, the supporting plate being mounted to slide lengthwise on the bottom of the frame, a rack secured to the under side of the supporting plate, a train of gear wheels mounted in the frame, the gear wheel at one end of the train being journaled in a recess in the bottom of the frame and in mesh with the said rack, the gear wheel at the other end of the train being journaled in the recess in the side member of the frame, a lever mounted to swing on the axis of said last mentioned gear wheel, a pawl carried by said lever for engaging said gear wheel, manually controlled means connected with the lever for actuating the same, and means for adjusting the throw of the lever.

In testimony whereof I have signed my name to this specification in the presence of two subscribing witnesses.

HERMANN FISCHER.

Witnesses:
 THEO. G. HOSTER,
 PHILIP D. ROLLHAUS.

Copies of this patent may be obtained for five cents each, by addressing the "Commissioner of Patents, Washington, D. C."